Aug. 29, 1933.  C. L. KELLER  1,924,609
CYLINDRICAL AND THE LIKE CONTAINER MADE OF COMPOSITE MATERIALS
Filed Oct. 6, 1930
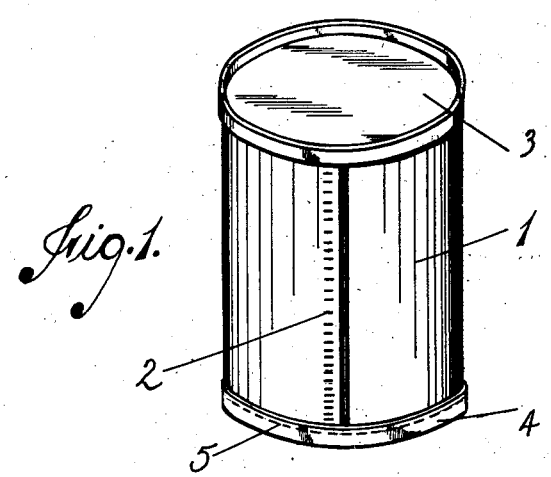
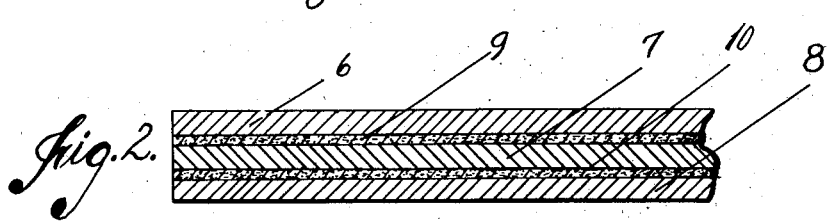
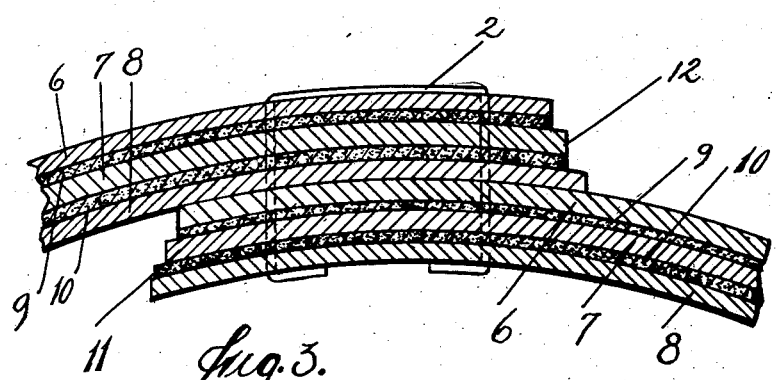
INVENTOR.
Charles L Keller
BY
ATTORNEYS Patented Aug. 29, 1933

1,924,609

UNITED STATES PATENT OFFICE 1,924,609

CYLINDRICAL AND THE LIKE CONTAINER MADE OF COMPOSITE MATERIALS

Charles L. Keller, Cincinnati, Ohio, assignor to The Richardson Company, Lockland, Ohio, a corporation of Ohio Application October 6, 1930. Serial No. 486,586

3 Claims. (Cl. 229—3.5)

My invention relates primarily to the manufacture, from pre-formed panel-like composite boards, of containers of such shape as requires the bending of the boards along an arc as distinguished from scoring the boards and bending them at an angle. A typical form of such containers is cylindrical—barrels, kegs, or the like—and while my invention is not restricted to this form, I shall describe it in connection therewith as an exemplary embodiment.

Thin materials may be bent under most circumstances without particular difficulty, or may be convolutely wound about a mandrel. Where the container is to be made of composite boards of considerable thickness, however, a serious problem is presented. Since it is commercially inconvenient to form very thick plies of paper machine product on a wire or a single or multi-cylinder machine, where thick boards or panels are desired, it is the practice to make them by cementing together a plurality of plies of suitable paper machine product. Such composite or pasted boards are relatively stiff, and it is not practicable to bend them substantially without danger of disrupting the board by splitting the outermost ply of the board, buckling the innermost ply, or separating the plies at a number of points. Where the board is disrupted, the curvature of the bend is ordinarily not smooth, and the strength of the container is impaired.

It is an object of my invention to provide a method of making containers of this character without disrupting the board, and to provide a board which can be formed into such containers without difficulty, together with containers so formed.

These and other objects of my invention which will be set forth hereinafter or will be apparent to one skilled in the art upon reading these specifications, I accomplish by that certain construction and arrangement of parts of which I shall now set forth an exemplary embodiment, reference being had to the drawing which forms a part hereof.

In the drawing:—

Figure 1 is a perspective view of an exemplary form of container embodying my invention.

Figure 2 is a sectional view upon an enlarged scale of a portion of a panel or board.

Figure 3 shows, also upon an enlarged scale, the condition of a container at the meeting point of the board.

When board of considerable thickness is bent arcuately, the layers upon the inside of the curve are compressed, while the layers upon the outside of the curve are tensioned. As hereinabove indicated, this may result in a parting of the outer layers, and in a buckling of the inner layers which parts them from adjacent layers or splits them internally. In the manufacture of angular containers from the so-called "solid fiber board" of commerce, it is the practice to score the board whereby an artificial separation of plies is produced along the line of the bend. Such a practice is not applicable to the formation of curved containers, since a continuous or substantially continuous separation of plies weakens the product.

In the practice of my invention, I provide a board which may be bent arcuately without these disadvantages, by cementing the plies together with a substance which, while adequate adhesively to gain the structural effect desired, is also capable of permitting the several plies of board to move slightly relative to each other. The usual adhesive employed in forming multiple boards— namely silicate of soda solution alone—is not suitable for my purpose, nor are other adhesives which set to a rigid, hard, and non-plastic condition. A large number of adhesives may be fitted for use in my invention through the use of plasticizers or gelatinous substances. Where the container is to be made at once from freshly made board, an adhesive may be employed which ultimately sets to a hard and non-yielding condition. The effective plasticity, by which I mean the quality in the cementitious layer between adjacent board plies which enables these plies to move relatively to each other, can be controlled both by the characteristics of the adhesive employed and by the thickness of the layer thereof between the plies. Among the adhesives which I may use, I prefer for most purposes, a bitumen such as asphalt, because it can be easily tempered to give a desired plasticity at ordinary temperatures, because it is inexpensive enough to permit the use of layers of appreciable thickness, and because it contributes to the water-and-moisture-resistant characteristics of the finished container. My invention is not restricted to the use of asphalt, other bitumens, waxes, resins, gums and animal, vegetable or mineral adhesives being suitable provided they do not set to a hard non-plastic condition, or have been treated with an agent to prevent or delay such setting.

My invention is not restricted to any particular kind of paper machine product making up the individual plies of the board. There is, however, a necessary relationship between the inherent strength of the plies and the effective plasticity of the cement in that the cement or adhesive layer must give, permitting the slippage of one ply over the other before the stress becomes greater than the rupture or splitting strength of any ply. My invention is useful with relatively light and relatively dense plies. In the manufacture of containers from composite boards including a ply or plies of the felted product of a bituminous pulp—such as that made in accordance with the teachings of the Stevenson and Buron Patent No. 1,771,150, of July 22, 1930—which plies, when they contain a considerable percentage of thermo-plastic binder substance, exhibit the characteristics in part of a plasticizable composition, it was found impossible to make containers of this type, prior to my invention, excepting by the plastic deformation of the sheets under heat and pressure.

In Figure 1 I have shown a typical container having a body 1 formed into cylindrical shape with overlapping edges, and held by a line of metal clamps or stitches 2, such as are employed in the manufacture of solid fiber shipping cases. The forming and stitching may both be done upon a suitable mandrel. The top of the container may be bound with metal as at 3 in such a way that the top edges are protected, and a seat is formed for a head. The bottom may be similarly fitted, or I may make a flanged head of panel board having a flange portion 4 to extend along the cylindrical portion 1 of the container, to which it may be fastened by a line of stitching 5. Instead of the metal binding, or in addition thereto, the top may be provided with a similar flanged head to be placed within it and stitched thereto. The bottom and top closures may be otherwise effected.

In Figure 2, I have illustrated a board or panel from which such a container may be made. It comprises layers or plies 6, 7 and 8, usually of paper machine product, and for waterproof containers preferably comprising the felted product of a bituminous pulp as hereinabove referred to, although it may comprise plies of other materials. The plies are cemented together with layers 9 and 10 of cementitious substance of the character described, the effective plasticity of which, with relation to the inherent strength of the plies, is such as to permit the relative slippage of the plies.

When such a board is bent about a mandrel or otherwise formed into the curved body of a container, the plies may move one over the other in order to relieve the strains set up by bending, without at the same time freeing the plies one from the other. When so bent, the edges of the plies may assume the offset relationship shown at 11 and 12 in Figure 3.

Having thus described my invention, what I claim as new and desire to secure by Letters Patent, is:—

1. A process of making curved containers which comprises cementing together a plurality of plies of material, two at least of said plies being of the thickness of boxboard, with an adhesive substance of plastic character, and while the resistance to flow of said adhesive is less than the inherent strength of said plies, bending the composite board so formed into an arcuate shape without scoring the same, whereby said plies are caused to move relatively to each other.

2. A curved container comprising a blank of plies of boxboard thickness, at least one of which is the felted product of a bituminous pulp, said plies cemented together with a bitumen having a resident plasticity at ordinary temperatures, said blank being bent to a cylindrical shape without scoring and fastened, without separation or disruption of plies.

3. A cylindrical container formed of a blank of plural ply board, two at least of said plies being of boxboard thickness, said plies adhesively joined, and said blank bent to a cylindrical shape, and characterized by a relieving of the strains due to said bending by a slipping of the several plies on each other, without a disturbance of the continuous adhesive relationship between plies and without scoring of the plies.

CHARLES L. KELLER.